United States Patent Office 3,417,653
Patented Dec. 24, 1968

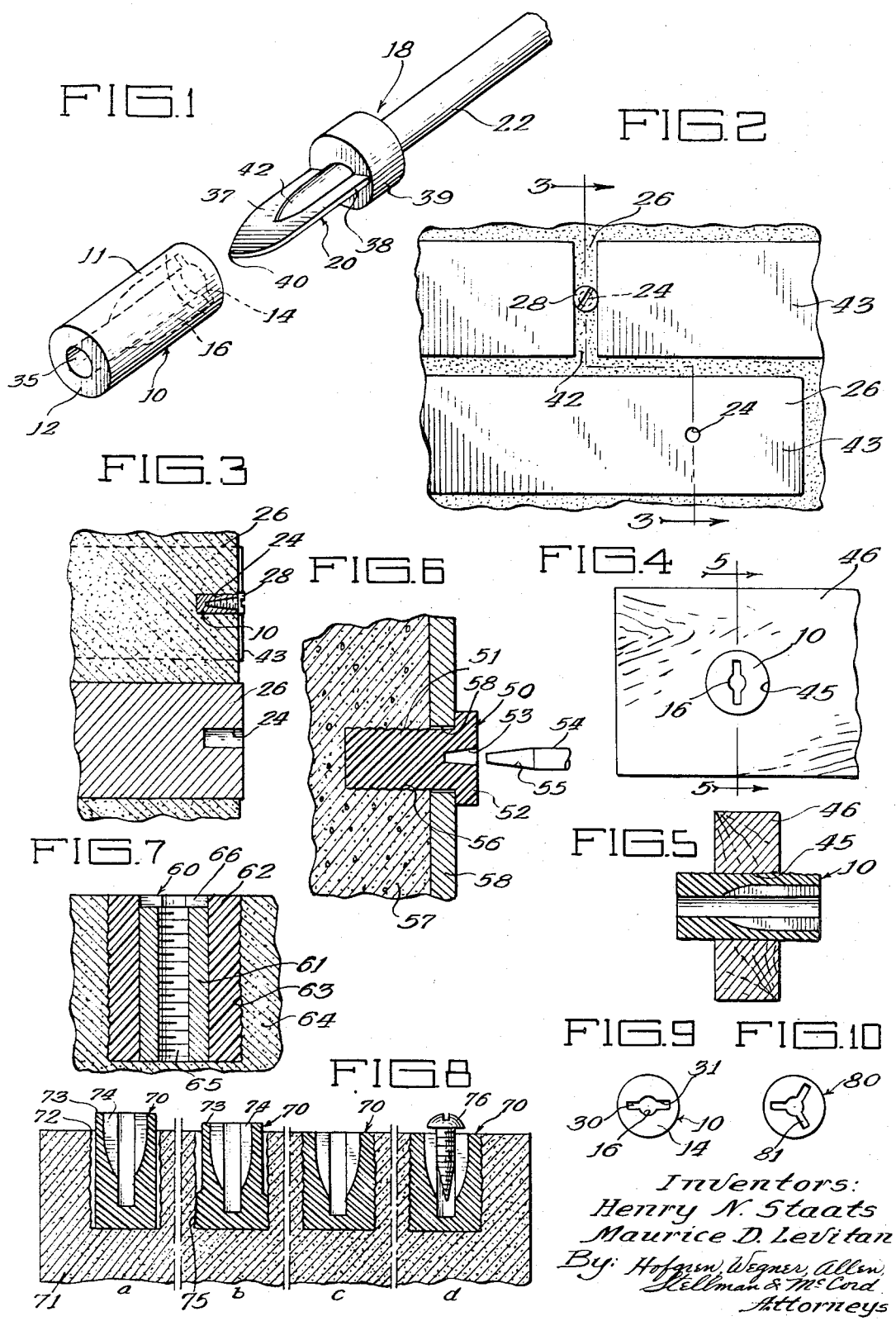

3,417,653
SPIN FASTENED ANCHOR
Henry N. Staats, 1344 Linden Ave., Deerfield, Ill. 60015, and Maurice D. Levitan, 411 Romona Road, Wilmette, Ill. 60091
Filed Jan. 14, 1966, Ser. No. 520,734
2 Claims. (Cl. 85—63)

ABSTRACT OF THE DISCLOSURE

An anchor or a fastener which has at least a skin portion of a thermoplastic resin material on a cylindrical body; the body of the anchor being provided with internal means engageable with a rotatable tool to be driven at electric hand drill speed in order that the anchor may be frictionally heated by rotation against the sides of an aperture to receive the anchor, thereby softening the thermoplastic resin to a flowable state while the anchor is inserted into the aperture whereafter the rotation is stopped so that the resin may harden, thus securing the anchor in the aperture within the base material.

---

This invention relates to anchors and more particularly to improved anchor devices having at least an outer surface covering of thermoplastic resin so that such anchors may be rotatably driven during seating in a wide variety of natural and man made building materials to frictionally heat and soften the resin for flowing into intimate adhesion with the base material and the method of seating said anchors therein.

For a long time, the attachment of one member, such as a board, to a masonry part, such as a concrete wall, has been a constant source of continued problems. There are occasions when attaching any one member, which can be a metal part, to another member, which can be a board, is a problem. Many solutions have been proposed and are in use such as drilling a hole in the one member, such as the masonry part usually with a special tool, seating an expandable anchor in the hole and then spreading the anchor by means of a fastener (such as a screw) to form the attaching means for said fastener. Other solutions have been used self-tapping drills on the anchor for drilling and seating the anchor simultaneously.

Some anchoring methods call for pouring molten lead into a drilled hole to form the anchor or adhesively securing the anchor in the drilled hole.

The above prior solutions and others not mentioned generally require special drills and special anchors, together with special expansion or seating methods for positioning the anchor for use. The ratio of the depth of the hole to the diameter of the hole is critical to some anchors. The tools and anchors are expensive and since generally the anchors are metal, they do not always seat themselves firmly, necessitating rework and/or replacement. The prior anchors are only usable in masonry or in wood but not in both, thus requiring separate inventories of each type of anchor.

It is therefore a principal object of our invention to provide an improved anchor means which substantially overcomes the principal problems of the prior art.

It is another object of our invention to provide an improved anchor means which can be used with masonry, wood and other common building materials.

And another object of our invention is to provide an improved anchor means which can be used in blind holes, through holes, rough and smooth surfaced holes, and out of round or irregularly shaped holes.

Another object of our invention is to provide an improved anchor means which can be seated for use by means of a conventional power drill.

Still another object of our invention is to provide an improved anchor means which is formed with at least a peripheral layer of a material which will assume a physical state under the heat generated in seating the anchor in an aperture in a member, which physical state will serve to bond the anchor to said member.

And another object of our invention is to provide an improved anchor which will bind itself to a base means without assistance from the expansion created by the fastening means inserted in said anchor.

A further object of our invention is to provide an improved anchor which can be used either as an anchor or as a fastener or as both an anchor and a fastener.

Further objects and advantages will become apparent from the following detailed description taken in connection with the accompanying drawings in which:

FIGURE 1 is an exploded perspective view of an anchor and setting tool showing one form of our invention;

FIGURE 2 is an elevation view of a couple of courses of a brick and mortar wall having two anchors in place therein;

FIGURE 3 is a cross sectional view taken on the line 3—3 of FIGURE 2;

FIGURE 4 is an elevation view of a board showing one of our anchors in place therein;

FIGURE 5 is a cross sectional view taken on the line 5—5 of FIGURE 4;

FIGURE 6 is a sectional view showing another form of our invention;

FIGURE 7 is a sectional view showing still another form of our invention;

FIGURE 8 is a schematic showing of the various stages in setting one of our anchors in a blind hole;

FIGURE 9 is a view looking at the top end of the anchor of FIGURE 1; and

FIGURE 10 is a view similar to FIGURE 9 showing another form of our invention.

In the embodiments of the invention as shown and described in the drawing, similar reference numerals refer to similar parts throughout the several views, and in particular in the form of invention shown in FIGURES 1 to 3 and 9, inclusive, an anchor 10 is illustrated as having a generally cylindrically shaped body 11 with a bottom wall 12, a top wall 14 and a shaped aperture 16 down the axial interior thereof. A setting or driving tool 18 as shown in FIGURE 1 has a shaped protruding portion 20 and a drill chuck engaging portion 22. Any aperture or hole 24 in a base member 26 of substantially the same diameter as the diameter of the anchor 10 is adapted to receive the anchor 10 in set or seated relationship so that a fastening means 28 can be threaded therein for securing some member to the apertured base 26.

Specifically the form of the invention shown in FIGURE 1 has the generally cylindrically shaped body 11 of anchor 10 formed of a material which is adapted to soften or plasticize at and near its outer periphery as said periphery is subjected to an appropriately high temperature. The heat or rise in temperature contemplated is cerated by friction between the outer peripheral wall of the anchor 10 and the wall of the aperture 24 in the base member such as base 26. As an example, it has been found that a thermoplastic resin material of the polyethylene type can be used to form the body 11 which body 11 is molded with the outer surface generally cylindrical in shape and with the shaped aperture 16 extending down the inside thereof. The aperture 16 has a pair of substantially thin wing shaped side openings 30, 31 meeting in a circular bore 32 down the center of the body 11. The openings 30, 31 are widest at the surface of the top wall 14 and converge toward each other down the inside of the body 11 until they theoretically meet at an imaginary apex. The body 11 has an aperture 35 extending from the bottom wall 12 to a junction with the shaped aperture 16 within the confines of the body 11.

The driving or setting tool 18 for the anchor of FIGURE 1 has the shaped driving portion 20 comprised of a generally flat blade 37 shaped from a wide portion 38 at a collar 39 down to a point 40 removed therefrom. The chuck engaging portion 22 is formed integrally with the blade 37 and tapers at 42 into the walls of said flat blade 37 beyond said collar 39. The driving portion 20 is adapted to substantially coincide in shape and size to the shaped opening 16 in the plug or body 11 so that an anchor 10 can be impaled on the tool 18. The tool 18 is adapted to have the portion 22 locked in the chuck of an electric drill (not shown) such that the tool 18 and anchor 10 can be rotated about their longitudinal axes at a speed equal to the number of revolutions per minute generated by said electric drill. The collar 39 is provided as a shield or stop to prevent the driving portion 20 of the tool 18 from being forced too far into the anchor 10.

The base member 26 is drilled in a conventional manner as by means of a star drill, a hardened tip rotating drill or the like. As shown in FIGURE 2, apertures 24 are formed into two different bases 26, in one case the base is the mortar 42 between two bricks 43, and in the other case the base is one of the bricks 43. The base 26 could be masonry material such as concrete, cinder blocks, bricks and the like, as well as wood, metal, composition boards such as Masonite, and other materials usually used in building. The aperture 24 can be deep, shallow, or out of round with a diameter to depth ratio of from about 1 to 1 or greater. The diameter of the aperture 24 can be slightly larger than, equal to or can be even smaller than the diameter of the plug or body 11 of the anchor 10. In FIGURES 2 and 3 the diameters of the apertures 24 are slightly smaller than the diameter of the anchor 10.

With an anchor 10 and tool 18 being rotated by an electric drill at the output speed usually generated by an electric drill, the bottom 12 of the anchor will be aligned with the mouth of the aperture 24 and urged into contact with base 26. The speed of the drill will generate sufficient heat from friction between the wall of the aperture 24 and the peripheral wall portion of the body 11 to plasticize or soften a discrete radial depth of the plastic material of said body as said anchor is urged into the aperture 24. When the anchor is at the depth desired in the base 26, the drill is stopped. The softened surface area of the plastic body 11 will almost immediately set up in intimate bonding relation to the walls of the aperture 24. In a couple of seconds the material of the anchor 10 will be solidified again such that the tool 18 can be withdrawn from the opening 16 in the anchor 10. A screw or other fastening device 28 can then be threaded into the opening 16 for securing a member to the base 26.

Conventional electric drills rotate at about 1500–2500 revolutions per minute which is sufficient to cause a skin or discrete radial thickness of a material such as polyethylene to soften or become sufficiently fluid or pliable when in contact with an abrasive surface to flow into the crevices in the abrasive surface of the base 26 such that when the drill is stopped, the soft or pliable skin of the plastic material will harden in the shape of the abrasive surface. The plastic conforms itself to the walls of the opening such as to form a unitary lock or bond between the anchor and the base.

FIGURES 4 and 5 illustrate the setting or seating of an anchor 10 in an aperture 45 in another piece of material 46. That is, an aperture 45 is drilled in, and in this case through, a base which could be masonry, wood, Masonite, fiberboard, metal or the like. An anchor 10 which is slightly larger in diameter than the diameter of said aperture 45 is impaled on the tool 18 and with the drill rotating the tool and anchor, the anchor is forced slowly into and partway through the material 46. As soon as the drill is shut off the temporarily softened or pliable skin of the plastic material will harden with the plastic embedded into the crevices, cracks and depressions in the walls of said aperture 45 so that the anchor 10 will be seated or bonded to said material 46 ready to receive a fastener therein.

It has been found that with the properly selected plastic materials for the anchors 10, the anchors can be seated in seated or bonded relationship to masonry, wood, metals and composition boards such as fiberboard and the like. The relationship between the speed of rotation of the anchor with respect to the walls of the aperture in the base receiving the anchor, together with the types of material making up the anchor and into which the anchor is to be set, form important aspects of the invention.

The anchors of the invention can be made with a different structure for different purposes as long as a layer of plastic material is formed around the outer peripheral surface so that the heat of friction of setting the anchor will produce the necessary conditions for creating the setting or bonding action to a base member. FIGURE 6 shows a modified anchor 50 which has a body portion 51, a head portion 52, and a tool receiving opening 53. The anchor 50 is molded of a plastic material such as polyethylene. The tool receiving opening 53 in this embodiment is shaped like a female form of a conventional screwdriver 54, so that a head 55 on one end portion of the screwdriver 54 can be inserted therein in seating and nesting relation. The other end portion of the screwdriver is adapted to be gripped in a chuck of an electric drill so that the screwdriver head 55 and anchor 50 in contact therewith will be rotated or driven at the speed of the drill.

A relatively shallow blind hole 56 is drilled in a conventional manner into a base such as a concrete wall 57. A board 58 having an enlarged aperture 59 is to be mounted to the wall 57 by means of the anchor means 50. The body 51 of the anchor 50 is slightly smaller in diameter than the hole 56 but is slightly longer than the depth of said hole, such that the end of the anchor touches the bottom of the hole with some clearance still visible between the head 52 of the anchor and the board 58. The screwdriver 54 rotating the anchor 50 against the bottom of the blind hole 56 will soften or make pliable the bottom surface of the anchor 50 causing the body 51 of the anchor to soften and to spread out. Continued rotation of the anchor will gradually soften the walls of the anchor starting from the bottom end and extending up the sides of anchor 50 until the hole 56 is substantially filled and the head 52 of the anchor bears against the board 58. When the drill is stopped, the anchor 50 will solidify and bond to the walls of the hole 56, locking the board to the concrete base. The head of the screwdriver 55 can be removed from the anchor 50 as soon as the anchor 50 has solidified.

FIGURE 7 shows another embodiment of the invention wherein an anchor 60 is comprised of a threaded insert 61 molded into a body 62 thereof. The body 62 is formed of an appropriate plastic material such that when the anchor 60 is seated in the aperture 63 in a base 64 by means of a rotating electric drill, the surface areas of the body 62 will become softened or pliable enough to bond to the walls of said aperture 63 without releasing the bond on the insert 61. The insert 61 can be made of an appropriate metal and can be threaded as at 65 such that a machine screw or the like can be screwed therein. In the illustrated form of FIGURE 7, a screwdriver slot 66 in formed in the one end of the insert 61 of the anchor 60 such that a tool with a screwdriver tip mounted in an electric drill can be engaged therein for rotating the anchor 60 during setting of the anchor in the base 64.

In FIGURE 8 four stages of setting anchor 70 in a masonry base member 71 is illustrated. That is, an oversized blind aperture 72 is drilled in the base 71. The anchor 70 which is longer than the aperture 72 is deep, is dropped into the aperture 72 as shown at *a*. It will be noticed that the diameter of the anchor 70 is smaller than the diameter of the aperture 72 and that the anchor 70 has the tool engaging opening 73 extending inward from the top end 74 of the anchor. An appropriate tool, such as the tool 18 of FIGURE 1, is engaged in the opening 73 in the anchor 70 and both the tool and the anchor are rotated by an electric drill. Pressure on the anchor 70 as it rotates will cause the bottom part of the anchor to become softened and pliable and spread out as shown at 75 in part *b* of FIGURE 8. Continued and continuous rotation of the anchor 70 will slowly cause the anchor to shorten and spread out as the surface of the anchor becomes softened and pliable throughout its length and as is illustrated in view *c* of FIGURE 8. When the anchor 70 is in the position desired, the drill is turned off and the softened material will harden in intimate engagement with the walls of the aperture 72. A fastener such as a screw 76 can be threaded into the opening 73 in the anchor 70 for securing parts to the masonry base 71, view *d*.

Various types of tool shapes and mating openings in the body of the anchor can be used as long as a positive engagement between the tool and the anchor is effected to assure transmission of the rotation of the tool to the anchor. As another example of a tool shape, FIGURE 10 shows a three-sided opening 81 in an anchor 80 which is adapted to be engaged by a three-sided tool for seating said anchor 80 in an aperture in a base member.

The anchors, such as anchor 10, could be tapered throughout all or a part of its length with the narrowest part at the bottom or hole engaging end, which taper serves to lead or guide the anchor into a hole in a base member. The holes or apertures such as aperture 24 could be tapered from a wider mouth to a narrower bottom also for leading the anchor into the hole, all without departing from the spirit of the invention. The shapes of the holes or apertures and the degree of roughness of the surfaces thereof are not as critical as they are in some prior anchor devices.

It has been found that the plastic materials polyethylene, polypropylene, nylon, Teflon and the like are suitable materials for the anchors and in particular for the outer peripheral surfaces thereof. The list is not intended to be all inclusive. Any of the thermoplastic resins that are known for their moldability characteristics have been found to be satisfactory. As a secondary consideration, availability and price would enter into any decision on the selection of the materal to be used for the anchor.

The nature of the bond between our anchor and the apertured body is so intimate and cohesive that anchors have been successfully placed in much shallower holes than heretofore. That is, prior anchors to be seated in concrete required a 3 to 1 or 5 to 1 ratio of depth of hole to diameter of hole. By comparison, we are able to secure a better anchoring effect with an anchor wherein the dimension of the outer diameter is substantially similar to the dimension of the axial length thereof. In the preferred embodiment, the ratio of anchor diameter to axial length is approximately 1 to 1. In turn, one need provide a hole in a workpiece having a 1 to 1 ratio of depth to diameter of hole using the improved anchor herein disclosed.

We claim:

1. An anchor means comprising a cylindrically shaped body portion, said body portion having an outer skin formed of heat softenable plastic material flowable upon frictional rotational application against a base material, and said body portion having an axial aperture extending at least part way therethrough, said aperture having shaped side walls such that a correspondingly shaped tool removably inserted therein may force said body to rotate with the tool, and said aperture being adapted to receive a threaded member therein, the dimension of the anchor body outer diameter being substantially similar to the dimension of the axial length of the anchor body.

2. The anchor means of claim 1 wherein the ratio of the outer diameter of the anchor body to the axial length thereof is approximately one to one.

References Cited

UNITED STATES PATENTS

| | | | |
|---|---|---|---|
| 1,147,045 | 7/1915 | Peirce | 52—741 |
| 1,570,234 | 1/1926 | Feldmar | 85—63 |
| 1,959,463 | 5/1934 | Dennis | 85—63 |
| 2,745,521 | 5/1956 | White | 151—7 |
| 2,748,824 | 6/1956 | Brill | 151—7 |
| 3,124,439 | 3/1964 | Rittenhouse | 264—249 |
| 3,191,864 | 6/1965 | Moses | 85—63 |
| 3,253,629 | 5/1966 | Kahn | 85—63 |
| 3,283,641 | 11/1966 | Wagner | 85—63 |
| 1,967,039 | 7/1934 | Mohr | 85—4 |
| 2,701,719 | 2/1955 | DiPierro | 156—73 |
| 2,933,428 | 4/1960 | Mueller | 156—73 |
| 2,942,748 | 6/1960 | Anderson | 85—39 |
| 3,244,574 | 4/1966 | Decker et al. | 156—73 |
| 3,252,493 | 5/1966 | Smith | 85—39 |

FOREIGN PATENTS

| | | |
|---|---|---|
| 824,748 | 12/1959 | Great Britain. |
| 104,975 | 5/1924 | Switzerland. |

OTHER REFERENCES

"Fabrication by Friction," from PLASTICS, December 1945, pp. 64, 66, 67, 113, 114, 115.

MARION PARSONS, JR., *Primary Examiner.*

U.S. Cl. X.R.

156—72; 52—741